Jan. 24, 1967   F. J. LUKETA   3,299,559
TRAWL NET LOAD RESPONSIVE APPARATUS
Original Filed Aug. 26, 1960   3 Sheets-Sheet 3
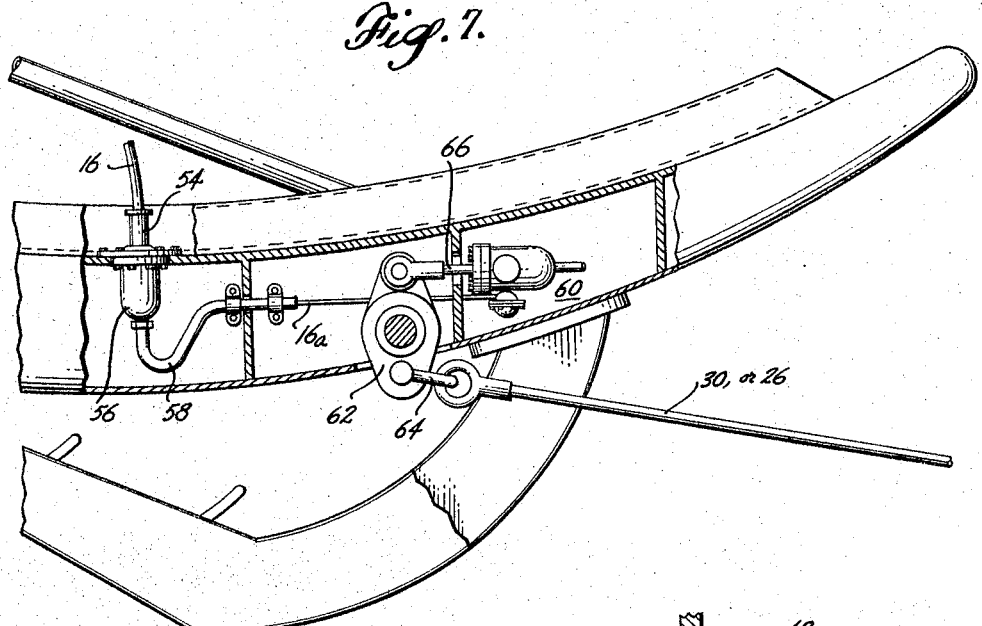
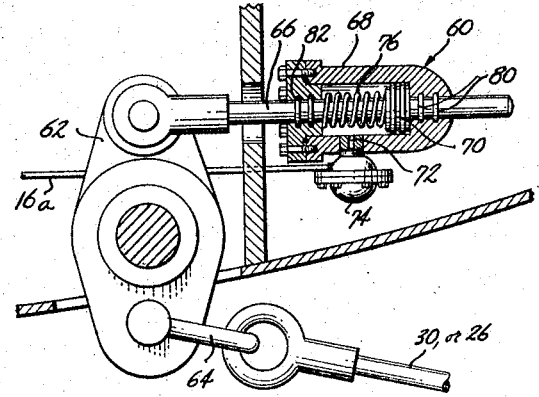
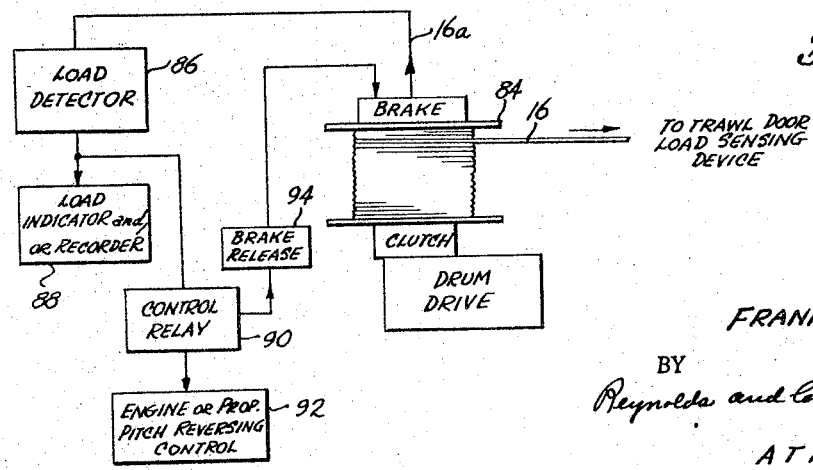
INVENTOR.
FRANK J. LUKETA
BY
Reynolds and Christensen
ATTORNEYS

# United States Patent Office 3,299,559
Patented Jan. 24, 1967.

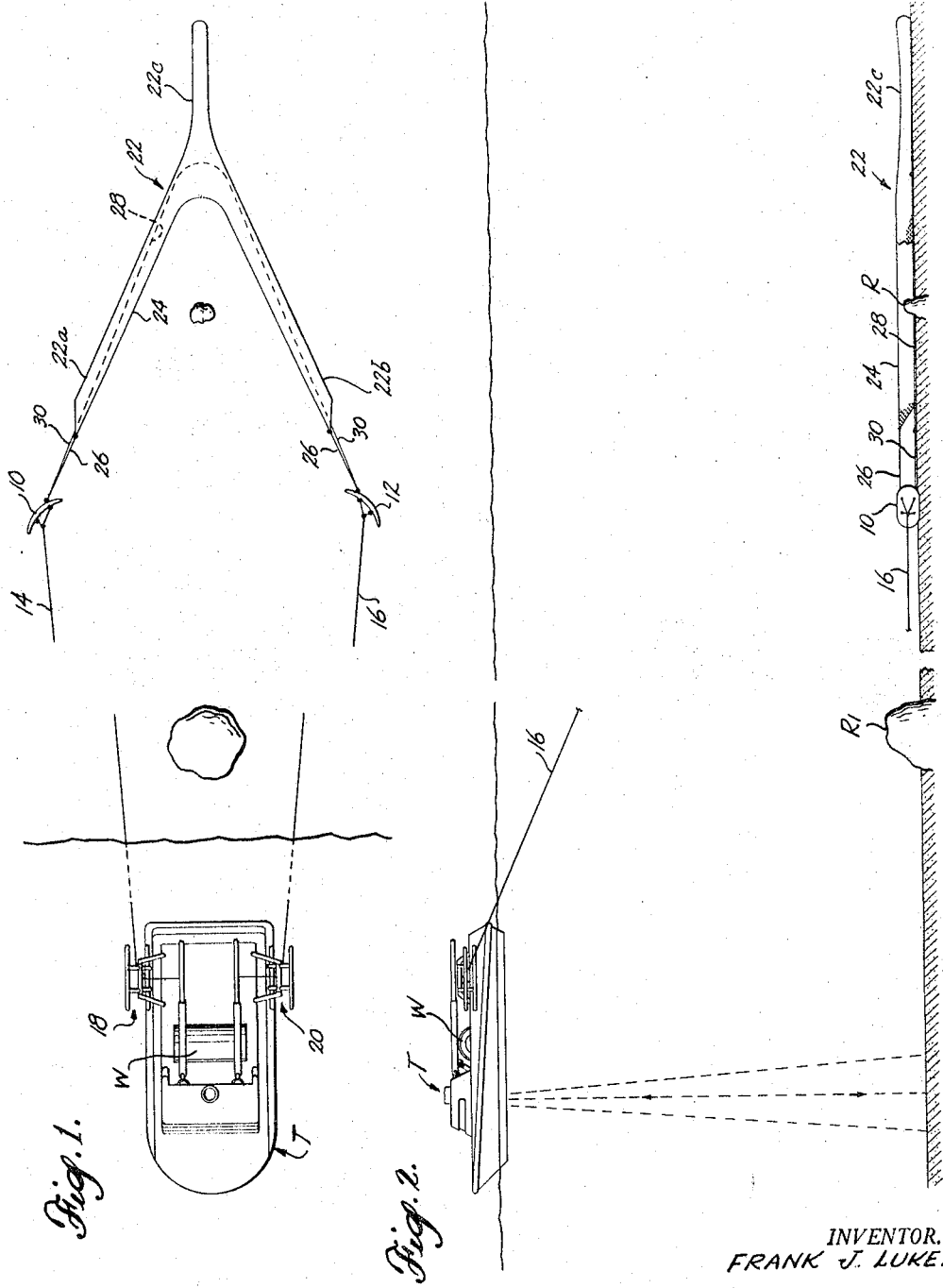

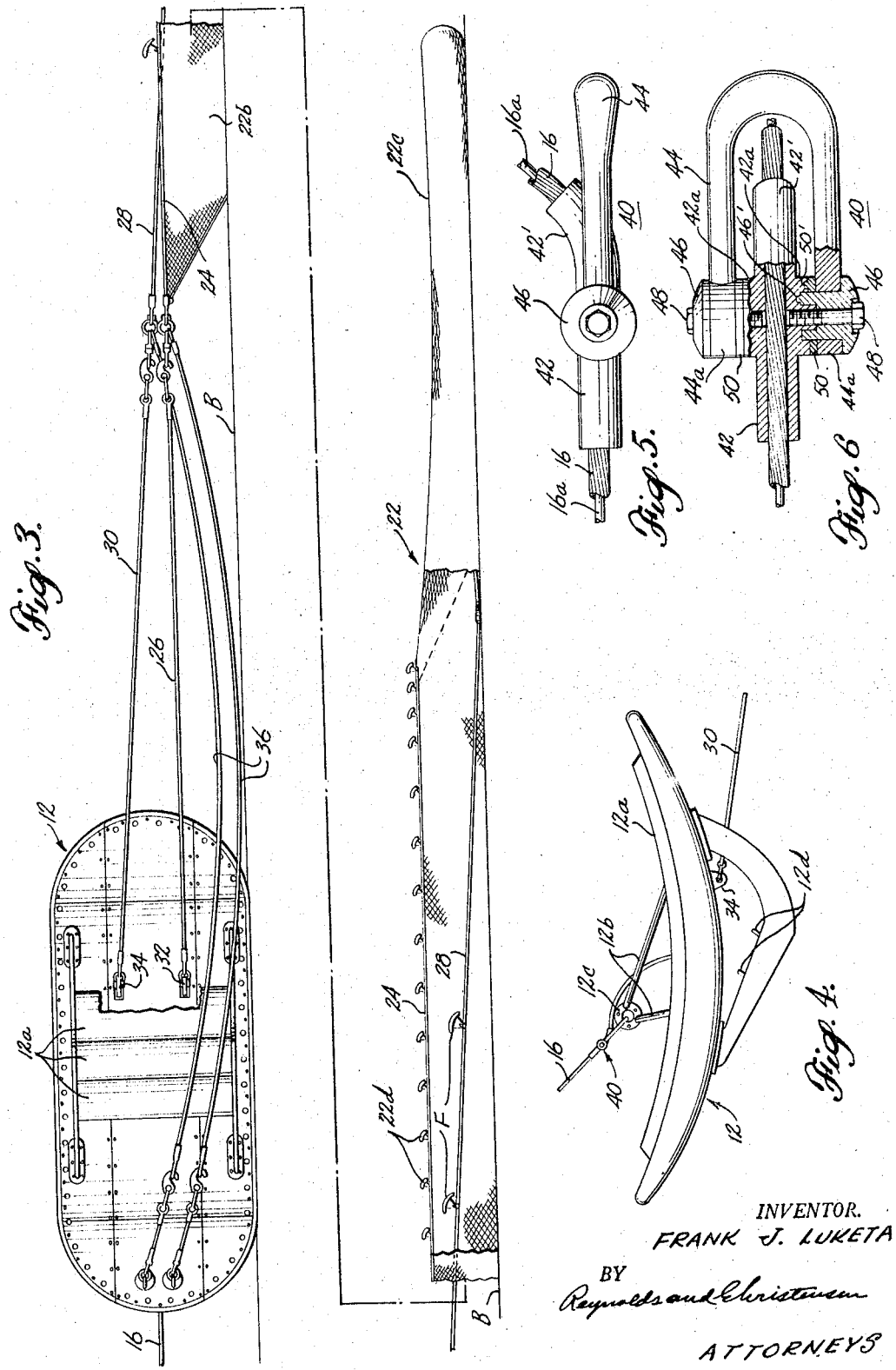

3,299,559
TRAWL NET LOAD RESPONSIVE APPARATUS
Frank J. Luketa, 5567 Greenwood Ave.,
Seattle, Wash. 98103
Continuation of application Ser. No. 305,485, Aug. 29, 1963, which is a continuation of application Ser. No. 52,141, Aug. 26, 1960. This application Dec. 16, 1965, Ser. No. 520,818
10 Claims. (Cl. 43—9)

This application is a continuation of my now abandoned, copending application Serial No. 305,485, entitled, Trawl Net Load Responsive Apparatus and Method, and filed August 29, 1963, as a continuation of my now abandoned, prior application Serial No. 52,141, filed August 26, 1960, and entitled, Trawl Net Load Responsive Apparatus and Method.

This invention concerns trawling for fish, particularly bottom trawling, and provides a method and apparatus for determining when and by how much the drag of the gear has been increased.

It will be understood by those skilled in this art that the gear produces quite an appreciable drag, even when empty. Beginning with the cod end, the drag increases with each net component forwardly of the cod end—the curtains and sweeplines, the door and finally the towing warps. Each adds its individual drag to the total, until the total drag is quite large. Depending upon the size of the net, this total drag may be as low as four or five thousand pounds, and with large automated trawlers of a type now contemplated may be as high as one hundred thousand pounds or more.

When the cod end of a trawl net is filled, the total drag is increased, but the load of fish, being in part a live load, does not increase the drag by the weight of the catch. Indeed, a full load of several thousand pounds of fish in the cod end of a net of the smaller type may increase the drag by only five or six hundred pounds, which is small in relation to the drag of the empty net. By this invention this relatively small increase in drag is sensed, and an indication is given to the skipper of the trawler, for there is nothing to be gained by continuing to drag a full net, and instead losses may occur from snagging and tearing the net or from predatory fish, and in any event there is an economic loss from failure to haul and empty a filled cod end promptly and to reset it.

Not only will the drag of the net increase gradually to a value consonant with a filled cod end, but the drag may also increase suddenly and very materially by snagging of one of the net's components—a sweepline, for instance—upon the bottom. Unless this increase is sensed and prompt measures are taken to relieve the strain, the forward progress of the trawler will be halted or the snagged component or other components may part or tear. This requires hauling the net and repair or replacement of the damaged components, with accompanying loss of valuable fishing time, and is likely to cause loss of part or all of the catch.

The present invention comprises a method and an apparatus for sensing reliably either such increase in drag, for indicating the same to the skipper, and in the case of a sudden high increase in drag from snagging, for automatically initiating corrective measures, such for instance as reversing the trawler's engines and paying out towing warps. Such a sensing device must be located where it can sense the smaller of such load increases, somewhere intermediate the net and the doors and preferably upon the doors themselves, yet must communicate the change in load to the vessel, whereon corrective apparatus will be located, and where the skipper can observe the load increases and determine when to haul a filled net, and when the net is not yet filled sufficiently to require hauling.

These are the general objects of this invention. It is also an object to provide a simple, rugged and durable means for transmitting net load indicating signals to the trawler compatible with the normal operating connections and apparatus required for trawling.

The invention is herein illustratively described by reference to the presently preferred embodiments thereof; however, it will be recognized that certain modifications and changes therein with respect to details may be made without departing from the underlying essentials involved.

Certain features of the present disclosure are included for purposes of background and are not intended to be considered as part of the inventive subject matter being claimed in the present case. Certain of these features, for example, are separately disclosed and claimed in my now abandoned, companion U.S. application Serial No. 331,614, entitled, "Multisection Trawl Door Construction," and filed December 18, 1963, as a continuation of now abandoned Serial No. 52,140, filed August 26, 1960, and entitled, "Multisection Trawl Door Construction." Other features, relating also to door details, are disclosed in my U.S. patent application Serial No. 477,238, entitled, "Polyhedral Trawl Doors," and filed August 4, 1965, as a continuation of now abandoned Serial No. 219,276, filed August 24, 1962, and entitled "Trawl Doors." Net floats of the type illustrated herein are disclosed and claimed in my U.S. Patent No. 3,013,356, granted December 19, 1961, and entitled, "Float for Trawl Nets." Door securing stanchion means of the type illustrated in simplified manner herein are disclosed and claimed in my U.S. Patent No. 3,006,097, granted October 31, 1961, and entitled, "Door-Securing Stanchion for Trawlers." The trawl net shown only in part herein is disclosed in detail in my U.S. application Serial No. 508,633, entitled, "Trawl Nets," and filed October 22, 1965, as a continuation of now abandoned Serial No. 362,228, entitled, "Curtain Trawl Nets," and filed April 24, 1964, as a continuation-in-part of now abandoned Serial No. 193,893, filed May 2, 1962, and entitled, "Trawl Net Especially for Bottom Fishing."

The present invention as herein disclosed comprises means in one or more of the connections between one or both of the trawl doors and the trawl net, or between portions of the trawl net, capable of sensing load in the net or portions thereof and means for transmitting signals thereof to the trawler, preferably through an electrical conductor embodied in the tow line. At the trawler utilization means are provided responsive to the transmitted signals; for example, an indicator, an automatically responsive device for reversing propeller pitch or for reversing the trawler engines, or a tow line winch release mechanism, the effect of which is to reduce tow line tension quickly enough to prevent net damage.

Another feature resides in connecting the net curtain line to a point on the door below the line of extent of the tow line connected to the door, and connecting the net sweepline to a point on the door above such line of extent, whereby a downwardly acting pitch moment is applied to the door effective to keep it on the bottom despite varying dynamic conditions encountered during trawling.

These and other features, objects and advantages of the invention will become more fully evident from the following description thereof by reference to the accompanying drawings.

FIGURE 1 is a simplified plan view showing a trawler with a net in tow, the tow lines being shown as discontinuous and with sections removed for convenience of illustration.

FIG. 2 is a side elevation view corresponding to FIG. 1.

FIG. 3 is an enlarged side elevation posterior view of a trawl door and trawl net interconnected in a novel manner (FIGS. 1 and 2 illustrate the conventional manner) the after portion of the net being offset from the remainder in the figure for convenience of illustration.

FIG. 4 is a top view of a trawl door in action.

FIG. 5 is a top view and FIG. 6 a side view with parts broken away, illustrating a novel electrical data transmission line shackle device for use in the trawling apparatus of this invention.

FIG. 7 is an enlarged fragmentary view with parts broken away illustrating a means for sensing trawl net loading and for transmitting electrically detectable signals thereof to the trawler.

FIG. 8 is an enlarged detail view showing certain features of the illustrated load sensing device, and more particularly an electrical-mechanical transducer mechanism and mechanical connections thereof.

FIG. 9 is a schematic diagram illustrating a utilization device by which load information transmitted electrically to the trawler may be employed to accomplish objects of the invention.

As will be recognized by those familiar with trawling, it is not possible by ordinary methods and apparatus to detect on the trawler soon enough a condition or conditions which produce net damage or are incipient to net damage. The great drag forces imposed by the doors on the tow line tend to overshadow and obscure the lesser forces representing incipient changes in load conditions to which the net is being subjected. Stretching of the long lines between the trawler and the doors also tends to make these conditions difficult to detect. Thus, if the net should snag or foul on a submarine object R or R1, serious damage could occur before the condition was detected, or if detected before remedial action could be taken. With the present invention it is possible to detect an overstress condition early in its development so that sufficient time will remain in which to reverse the pitch of the trawler propellers, reverse the trawler engines, or, for more instant results, release the tow line winches. The same means may be used to advantage in detecting and observing progress in loading of the net with a catch so as to program the operation more efficiently. It is important for reasons of efficiency not only that the fishing, in the case of bottom trawling, for example, be conducted at the correct level of depth and with an efficient net configuration, but that waste effort, either in terms of hauling in an insufficiently filled net or in terms of trawling an overfilled net, be minimized.

In the drawings trawl doors 10 and 12 are connected through towing warps 14 and 16 to the trawler T where the same are secured on hauling winches W suitably synchronized in order to assure co-positioning of the doors in terms of distance aft from the trawler. The trawl doors 10 and 12, when stowed, may be suitably supported on stanchion devices 18 and 20 mounted on respectively opposite sides of the trawler. Behind the trawl doors 10 and 12, the trawl net 22 is drawn by leg lines 26 and 30, with its curtains 22a and 22b spread apart and positioned in depth by their connections to the posterior sides of the travel doors. The cod end 22c which merges with the after end of the net body receives the catch. Floats 22d connected at intervals to the upper edges of the net curtains cooperate with weights (not shown) connected to the lower edges of the curtains to maintain the curtains in proper position. The line 24 (FIG. 3) which supports and suspends the curtains from their upper edges and which is coupled through a connecting leg line 26 to the trawl door, is referred to herein as the "curtain line." The line 28 which extends aft at a downward angle to the lower bosom supports the ground line of the net and is referred to herein as the "sweepline." The connecting leg line which extends between the trawl door and the forward ends of the sweepline 28, and which in effect is part of the sweepline, is designated 30. Lazy lines 36 extend between the forward ends of the sweep and curtain lines and forward connecting points on the door posterior, and are slack during trawling.

The sweepline 28, 30 assumes the tension load imposed by drag of the cod end and also tension load imposed by drag of the net wings. The curtain line imposes a substantially greater loading on the trawl door than the sweepline 28, 30 which primarily assumes cod end loading. By connecting the curtain line 24 to a point on the posterior side of the trawl door (i.e., to coupling element 32) which is located below the extended line of pull of the towing warp 16 (or 14), and by connecting the sweepline 28, 30, which extends from the ground line at the net's bosom, to a point on the trawl door, as to coupling element 34, which is located above such line of pull, the differential tension existing in the coupling lines 26 and 30 applies a downward pitching moment to the trawl door. This keeps the doors riding evenly upon the bottom edges, despite upward pull of the towing warps. Thereby the net is held to the bottom B despite variations in the dynamic conditions of fishing such as currents, changes in bottom contour, changes in loading of the net, rising and falling or pitching of the trawler, etc., which with conventional net connecting arrangements can cause the net to lose the bottom, at least for a time. In this case, however, the dynamic net forces themselves urge the door downwardly, so that the correction forces which develop tend to offset the displacing forces which would cause the doors and net to rise. Ballast and flotation means may also be used in the doors themselves, as described in the companion application above cited, and assist in urging the door downward while keeping it in an upright plane.

For purposes of comparison FIGS. 1 and 2 illustrate the conventional door-to-net connections.

The trawl door 12 as illustrated embodies details described in patent applications mentioned above. Thus, the door body is preferably of concave form on the anterior side and convex form on the posterior side and has fins or vanes 12a which provide stability and serve other functions. Auxiliary hydrofoil elements 12d mounted on the posterior side of the door provide increased stability and lateral thrust with minimum drag. A towing bridle 12b having a coupling ring 12c provides a means for securement of the towing warp 16 (or 14) to the door, as by means of the novel shackle device 40.

In FIGS. 5 and 6 the novel shackle device 40 comprises an elongated tubular member 42 through which the tow warp 16 (or 14) extends. In this instance, the warp 16 has as a core an electrical cable 16a which comprises one or more insulated electrical conductors used for purposes of the invention. The warp 16 is swaged to the tubular member 42 or is otherwise secured therein against longitudinal sliding. The shackle element by which the device 40 is coupled to the securing ring 12c comprises in this illustrated case a clevis type shackle 44 having apertured ends 44a through which flanged and headed grommets 46 pass in order to bear against opposite sides of bosses 42a on respectively opposite sides of the elongated member 42. These grommets are secured in place by bolts 48 threaded into the sides of the elongated member 42. Wear washers 50 are interposed between the inner sides of the shackle ends 44a and the adjacent sides of the bosses 42a, so that the shackle 44 itself is cushioned in and between the washers 50 and the flanges and heads of the grommets 46, and does not come in contact with the elongated member 42. The latter as a permanent fitting fixed on the cable 16 is saved from wear. Any wear which occurs will be assumed entirely by elements which are inexpensively and the clevis 44. The grommets and the washers have replaceable, such as the grommets 46, the washers 50 studs which are received in holes in the fitting member 42, these elements being designated 46' and 50', respectively, and serving the purpose of anti-rotation, so as to prevent sliding contact, hence wear thereof against the surfaces of fitting member 42.

Another and important feature of the shackle device 40 is the outward curvature at 42' of the elongated member 42 so as to guide and deflect the cable 16 away from the shackle member 44 in its normal load position wherein its plane is aligned with the direction of extent or stretch of the towing warp 16. This allows the clevis shackle 44 to assume such a position and to tilt through a moderate range of angles in either direction from such position without encountering interference from the shackle fitting or the warp, and it also assures that the warp will not be chafed and worn by such action. The conductor-cored towing warp extends unsevered and intact through the shackle fitting so that the electrical conductors are sheathed and protected thereby to the extreme ends.

An electrical connection is required at the door. For this purpose, a terminal fitting 54 on the towing warp engages a complemental fitting 56 on the door, and the two are sealed by a pressure-tight coupling arrangement of suitable design. From the fitting 56 conduits 58 extend, within the interior of the hollow-core door (FIGURE 7), to each of two electrical-mechanical transducers in load sensing devices 60, one associated with each of the lines 30 and 26. Each transducer senses line loading and converts the same into an electrically detectable signal which is transmitted through the electrical core conductor 169 in the towing warp to the trawler for utilization purposes.

The load sensing device 60 may assume various forms, and in the form shown comprises a rocker arm 62 provided at one end with a shackle 64 coupled to the forward end of the line 30, for example, or 26. During trawling the rocker arm is oriented so that the line of extent of leg line 30 is approximately perpendicular to the rocker arm 62. The other end of the rocker arm is pivotally connected to the end of a piston rod 66. A piston 70 carried by the piston rod 66 is received in hydraulic cylinder 68. The cylinder 68 is designed to withstand the large pressures generated internally and externally and is provided with a side port 72 which communicates with the interior of a hydraulic pressure sensing electrical transducer device 74 by which the electrically detectable signals representing net loading are generated. When tension develops in the line 30 the arm 62 is urged counterclockwise (as viewed in FIGURES 7 and 8) and its turning is resisted by the resulting increased pressure of hydraulic liquid contained in the interior of cylinder 68, due to displacement of piston 70 in the cylinder. This increased hydraulic pressure is transmitted through the port 72 to the interior of chamber 74 wherein it actuates a means (not shown) to convert pressure into an electrically detectable signal. A Bourdon tube, diaphragm, or other means responsive to hydraulic pressure and actuating a potentiometer or piezoelectric detector, are representative of transducer arrangements which may be employed.

It will be noted that the piston rod 66 extends through an opening in the end of the cylinder housing 68 opposite the arm 62. This projecting end of the piston rod is provided with sealing bushings or gaskets, such as O-rings 80, whereas similar sealing rings 82 are provided around the piston rod in the opposite end of the cylinder 68. This piston rod projection serves to equalize exactly the pressures exerted on the arm 62 and of the rod by various water pressures when trawling, which is done at many different depths, thus accuracy of the load sensor is not impaired. A light return spring 76 maintains the piston in its zero load position, as shown, when trawling load is not being applied.

In the block diagram in FIGURE 9, the towing warp 16 is shown wound on a power winch drum 84, with the core conductor or conductors 16a emerging from the winch (as by means of a brush and slip ring arrangement, not shown) and extending to a load detector 86 which may comprise an electrical amplifier, bridge circuit or other electrically responsive device. The response of this load detector to the electrically detectable signals transmitted from the trawl net connections may be utilized in any of different ways. For instance, its output may be applied to a load indicator and/or recorder 88 which indicates and/or records for the benefit of the trawl operator the existing load condition in the particular trawl line 30, or 26. It may also be applied to a control relay or other device 90 which, for example, may be used to operate the engine reversing controls or propeller pitch reversing controls 92. It may also be used to operate a brake-release mechanism 94 by which the winch drum 84 is decoupled in order to rapidly relieve tension in the line 16. All of these provisions may be made as well as others utilizing the information transmitted to represent the existing load condition at the net or a portion thereof.

The principle of the invention may be extended not only to embrace load-sensing means employed in the main or external connections between the net and the door at the location of the door, but may also be extended to load-sensing in selected internal parts or connections within the net itself. As previously stated, the important significance of sensing net loading or stresses as directly as possible, that is, by sensing the mat a location behind the trawl doors where they are not overshadowed by the larger drag forces prevalent, lies in being able to detect more reliably and immediately an incipient overload or danger condition, so as to provide the necessary time required for relieving tension in the tow lines before damage is done. Accurate measurement of progress in accumulating a catch so as to time the haul properly is also important, and can only be effected reliably if the sensing is done as closely as possible to the cod end.

It is established practice in trawling to tow the net in a certain direction for an hour or more at a time, and then to reverse and cover the same general area, so it is very desirable to know where most of the fish are caught during the progress of a tow. This enables the trawler to concentrate more productively on higher yield areas in subsequent tows. It should be said here that the fish catch sensing signal ideally is transmitted through the sweepline in the trawl illustrated since it by-passes the drag of the curtains and senses the loads of the cod end more or less directly. This makes for greater readability at the indicator since the relatively light fish catch loadings are not overshadowed by the large constant load of the curtains and net body.

The sweeplines depart from the conventional practice (for conventional, see FIGURE 2) in that they are raised above the bottom except where they connect to the ground line at the bosom of the net. They are attached high up on the door through the leg lines at their forward ends and are also suspended by detachable planing floats F as shown at FIG. 3. The purpose of this is to minimize the snag corralling tendency of the sweeplines which results in stopping the progress of the tow when the sweepline sliding along the snag deflects the sweep and ground lines at the bosom of the net to encounter the snag and thus stop the vessel's progress. This raised sweepline feature permits the vast majority of snags to pass harmlessly under the sweepline. The curtain line also is raised and the loose curtains themselves yield and rise inherently when snags are encountered to pass over them freely. The curtains, when they occasionally do snag, only rip slightly and do not stop the towing progress.

These and other features and aspects of the invention will be recognized by those skilled in the art on the basis of the foregoing disclosure of the presently preferred embodiment thereof.

What is claimed is:

1. A trawl device for connecting an electrical conductor-cored, load-bearing cable physically to a loading device such as a trawl door while passing such cable intact through said device to extend therefrom in both directions and to electric terminal means, said device comprising an elongated tubular member throughout the length of which the cable extends and having means by which said cable is gripped in non-sliding contact, a shackle, and means pivotally connecting the shackle to said tubular member intermediate the ends thereof to permit pivoting of the shackle on an axis disposed transverse to the length of the tubular member, whereby the shackle when loaded by said loading device may seek alignment with the stretch of cable emergent from the end of said tubular member and may freely pivot either way out of such alignment, the opposite end portion of the tubular member through which the cable also emerges being bent laterally away from the loaded cable-aligned shackle to clear the shackle of the cable in different pivoted positions of the shackle out of said alignment position.

2. In combination with an electrical conductor-cored, load-bearing submarine cable, a submarine device for connecting of such cable physically to a submarine loading device while passing such cable intact through said device to extend therefrom in both directions and to electric terminal means, said device comprising an elongated tubular member throughout the length of which the cable extends and having means by which said cable is gripped in non-sliding contact, a shackle, and means pivotally connecting the shackle to said tubular member intermediate the ends thereof to permit pivoting of the shackle on an axis disposed transverse to the length of the tubular member, whereby the shackle when loaded by said loading device may seek alignment with the stretch of cable emergent from one end of said tubular member and may freely pivot either way out of such alignment, the opposite end portion of the tubular member through which the cable also emerges being bent laterally away from the loaded cable-aligned shackle to clear the shackle of the cable in different pivoted positions of the shackle out of said alignment position.

3. In combination with an electrical conductor-cored, load-bearing submarine cable, a submarine fitting for connecting of such cable physically to a submarine loading device while passing such cable intact through such fitting to extend therefrom in both directions and to electric terminal means, said fitting comprising an elongated tubular member throughout the length of which the cable extends and having means by which said cable is gripped in non-sliding contact, a clevis-type shackle, and means pivotally connecting the ends of the shackle to respectively opposite sides of said tubular member intermediate the ends thereof to permit pivoting of the shackle on an axis disposed transverse to the length of the tubular member, whereby the shackle when loaded by said loading device may seek alignment with the stretch of cable emergent from one end of said tubular member and may freely pivot either way out of such alignment, said pivotal connecting means comprising mutually aligned pivot bolts engaged in holes in opposite sides of the tubular member, flanged and headed grommets, the ends of the shackle being apertured to pass the grommet flanges, and the grommets in turn passing the pivot bolts, and a wear bushing interposed between each aperture end of the shackle and the adjacent side of the tubular member, whereby the shackle ends are retained between the grommet heads and bushings, the opposite end portion of the tubular member through which the cable also emerges being bent laterally away from the loaded cable-aligned shackle to clear the shackle of the cable in different pivoted positions of the shackle out of said alignment position.

4. In combination: a forwardly open trawl net including a body portion having an after end, that is closed during trawling, a pair of side members extending divergently forwardly from said body portion on opposite sides of the net; towing means connected to and extending forwardly of said net to a trawler, and including a trawl door situated forwardly of each said side member, a curtain line interconnecting between each door and the forward end of the side member on its side of the net, a sweep line interconnecting between each door and said body portion and a towing warp extending from each door to the trawler; and means for detecting a change in the drag of said net, said means comprising: load sensing means anchored on at least one of said doors, with the sweep line associated with such door being connected to said load sensing means, said load sensing means serving to measure the amount of tension put into said sweep line by the drag of the body portion of said net, as the net is towed forwardly, and to derive a signal based on such amount of tension; means for transmitting said signal to the trawler; and means on the trawler for receiving and utilizing such signal.

5. The combination of claim 4, wherein said load sensing means is mounted on said door.

6. The combination of claim 4, wherein said load sensing means derives an electrical signal based on the amount of tension in the sweep line, and the means for transmitting said electrical signal to the trawler comprises an insulated electrical conductor physically incorporated in the towing warp that extends from the door on which the load sensing means is mounted to the trawler.

7. The combination of claim 6, wherein the means on the trawler for receiving and utilizing such signal comprises a meter adapted for direct reading by the operator.

8. In combination: a forwardly open trawl net including a body portion having an after end that is closed during trawling, a pair of side members extending divergently forwardly from said body portion on opposite sides of the net; towing means connected to and extending forwardly of said net to a trawler, and including a trawl door situated forwardly of each said side member, a pair of net lines interconnecting between each door and the net, and consisting of a curtain line interconnecting between each door and the forward end of the side member on its side of the net, and a sweep line interconnecting between each door and said body portion, and a towing warp extending from each door to the trawler; and means for detecting a change in the drag of said net body portion, said means comprising: load sensing means anchored on at least one of said doors, with the sweep line associated with such door being attached to said load sensing means, said load sensing means serving to measure the amount of tension put into said sweep line by drag of at least a portion of the net, as the net is towed forwardly, and to derive an electrical signal based on such tension; means for transmitting said signal to the trawler; and utilization means aboard the trawler for receiving such signal and reducing the tension of the towing warps when the signal reaches a predetermined value.

9. The combination of claim 8, wherein the utilization means for receiving the signal derived by the load sensing means, and for reducing the tension in the towing warps when the signal reaches a predetermined value, comprises winch means operable to pay out the towing warps from the trawler.

10. In a trawling system including trawl doors, a trawl net drawn, spread apart and positioned in depth by such doors, a trawler and connections including tow lines for towing the trawl doors and thereby the net, load sensing means operable for deriving a signal related to load force being transmitted from at least a portion of the net forwardly and ultimately to the trawl a door, said load sensing means comprising a rocker arm pivoted on the door and adapted for connection to the desired net load force transmitting line, and an electrical-mechanical force transducer mounted on the door, said rocker arm being actuatingly connected to the force transducer to operate the latter for producing an electrical signal related to such load, and means for transmitting said signal to the trawler, comprising an electrical conductor in the tow line, extending from the transducer to the trawler, and means on the trawler for receiving and utilizing said signal, said electrical conductor interconnecting said transducer and said receiving and utilization means.

References Cited by the Examiner

UNITED STATES PATENTS

| | | | |
|---|---|---|---|
| 2,079,021 | 5/1937 | Malcolm et al. | 73—143 |
| 2,513,153 | 6/1950 | D'Intino | 114—235 |
| 2,609,181 | 9/1952 | Jaeschke | 254—172 |
| 2,619,754 | 12/1952 | Slater | 43—9 |
| 2,671,288 | 3/1954 | Larson | 43—9 |
| 2,729,910 | 1/1956 | Fryklund | 43—9 |

OTHER REFERENCES

Modern Fishing Gear of the World, Fishing News (Brooks) Ltd., 4/1959, pages 226, 228, 229 and 233, SH 1 I 5.

SAMUEL KOREN, *Primary Examiner.*

W. A. CAMP, *Assistant Examiner.*